(12) United States Patent
Smith et al.

(10) Patent No.: US 7,929,640 B2
(45) Date of Patent: Apr. 19, 2011

(54) HIGH SPEED DIFFERENTIAL ENCODER AND INTERLEAVER

(75) Inventors: Andrew Donovan Smith, Rancho Palos Verdes, CA (US); Gerald R. Fischer, Playa Del Rey, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 745 days.

(21) Appl. No.: 11/559,975

(22) Filed: Nov. 15, 2006

(65) Prior Publication Data

US 2008/0112507 A1    May 15, 2008

(51) Int. Cl.
*H04L 27/20* (2006.01)
(52) U.S. Cl. ........ 375/308; 375/130; 375/146; 375/219; 375/283
(58) Field of Classification Search .................. 375/308, 375/130, 146, 219, 283
See application file for complete search history.

(56) References Cited

U.S. PATENT DOCUMENTS

| | | | | |
|---|---|---|---|---|
| 5,960,028 A | * | 9/1999 | Okamoto et al. | 375/130 |
| 6,055,266 A | * | 4/2000 | Nakamura | 375/140 |
| 7,177,362 B2 | * | 2/2007 | Chang et al. | 375/259 |
| 7,340,182 B2 | * | 3/2008 | Uemura et al. | 398/183 |
| 7,408,912 B2 | * | 8/2008 | Kasamura | 370/345 |
| 7,529,329 B2 | * | 5/2009 | Popescu et al. | 375/354 |
| 2004/0131089 A1 | * | 7/2004 | Uemura et al. | 370/537 |
| 2006/0034394 A1 | * | 2/2006 | Popescu et al. | 375/326 |

* cited by examiner

*Primary Examiner* — Shuwang Liu
*Assistant Examiner* — Dhaval Patel

(57) ABSTRACT

A plurality of differential encoders encodes a plurality of parallel data bit streams. XOR gates interleave the outputs of the differential encoders forming a single high speed differentially encoded bit stream with a data rate that is the sum of the data rate of the parallel data bit streams. The high speed data stream provides a single differentially encoded input to a differential phase shift keying modulator that generates symbols for a high speed optical communication system.

23 Claims, 7 Drawing Sheets

HIGH SPEED DIFFERENTIAL ENCODER AND INTERLEAVER

BACKGROUND OF THE INVENTION

1. Field of the Invention

The invention relates generally to data encoding. More particularly, the invention relates to high speed differential encoders.

2. Description of Related Art

Differential encoders produce an encoded data stream characterized by a change in the output state (from logical 1 to logical 0 or vice-versa) when an input logical 1 is present and no change when an input logical 0 is present. Thus, a differential encoder continually outputs the Boolean Exclusive-Or (XOR) of the previous output bit with the current input bit.

These differential encoders have latency problems that affect the data rates achievable. Typically, feedback around a flip-flop is used to compare the present input bit with the previous output bit. The feedback loop has response time limitations which in turn limit the maximum coding rate. Moreover, latency within the critical feedback path which must be accounted for has proven difficult to control during manufacturing. Alternative designs (for example a T flip-flop driven by a clock gated by the input data stream) have similar timing constraints that limit coding rate and make manufacturing more difficult.

Differential Phase Shift Keying (DPSK) systems use differential encoders to encode baseband signals for phase modulation on a carrier wave. A modulator shifts the carrier phase in discrete increments producing symbols corresponding to the bit pattern in the encoded baseband signal. A transmitter transmits the modulated carrier to a receiver over a communication channel. At the receiver, a phase comparator detects changes in phase of the carrier recovering the transmitted symbols. The symbols represent the bits of the encoded baseband signal. A differential decoder decodes the encoded baseband signal producing the original data stream bit pattern.

In an optical DPSK system a Mach-Zehnder modulator generates laser symbols from a differentially encoded bit pattern. The laser light travels over a communication channel and is detected by a delay interferometer. The delay interferometer sums the received light with light received one bit earlier, forming a light signal whose presence or absence indicates the presence or absence of a carrier phase change between the two bits. A photodiode converts the light intensity into an electrical signal. A circuit processes the electrical signal to produce the original bit stream.

The carrier signal in an optical system inherently has a large frequency and therefore accommodates a very large signal bandwidth or data rate. The data rates achievable in optical systems with DPSK modulation are often limited more by the data rate capability of the differential encoder than by other circuits or the channel (fiber or free space). Conventional differential encoders can encode at rates up to about 15 GHz. At frequencies higher than 15 GHz, feedback latency or other timing problems cause rapidly increasing design difficulties which may result in unacceptable encoding errors.

Those concerned with the development of high data rate communication systems have long recognized the need for faster and more accurate differential encoders. The present invention significantly advances the prior art by providing a high speed differential encoder that can be used to achieve higher data rates in optical DPSK systems.

SUMMARY OF THE INVENTION

The present invention differentially encodes a plurality of parallel low rate data streams and then interleaves the data streams to produce a single high rate differentially encoded data stream. The use of feed-forward interleaving allows the encoder to produce a single differentially encoded data stream with a data rate much higher than the maximum data rate achievable using a conventional differential encoder. One or more logic circuits, preferably XOR gates, combine the parallel differentially encoded data streams into a single differentially encoded data stream. Each logic circuit outputs a data rate that is the sum of the data rates of the input data streams. A feed forward XOR tree is constructed with the number of stages determined by the speed required for the single differentially encoded data stream. The output of the final stage, the single high speed data stream, has a data rate that is the sum of all the data rates of the parallel input data. The feed forward interleaving enables the invention to achieve data rates not heretofore realizable with differential encoder systems. Moreover, XOR gates can be manufactured with small gate delays and precise tolerances making them good components for use in high speed applications.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DETAILED DESCRIPTION OF THE PREFERRED EMBODIMENTS

Figure 1:
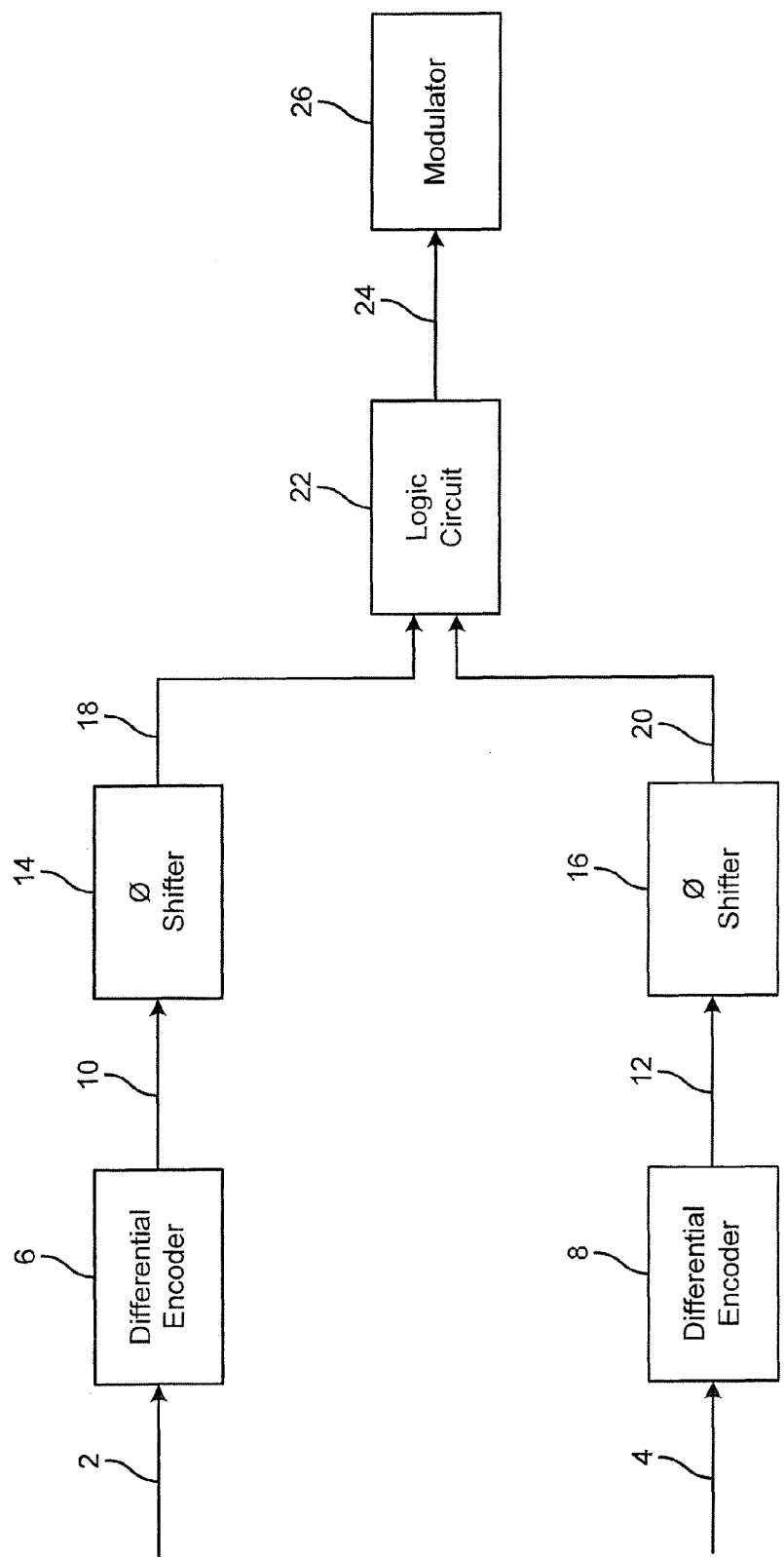
FIG. 1 is a block diagram of a data encoder for high speed modulation of a carrier signal, according to the invention.

The basic building block of the high speed data encoder using the present invention is shown in FIG. 1. A first high speed data stream 2 having a certain data rate, for example 10 GHz and a second high speed data stream 4 with the same data rate are fed to respective first differential encoder 6 and second differential encoder 8. Differential encoder 6 produces a first differential bit stream 10. Second differential encoder 8 produces a second differential bit stream 12. The first and second differential bit streams 10, 12 correspond to respective high speed data streams 2, 4.

A first phase shifter 14 shifts the phase of the first differential bit stream 10 by a predetermined amount resulting in a first phase shifted differential bit stream 18. A second phase shifter 16 shifts the phase of the second differential bit stream 12 by a predetermined amount, different from the first phase shifter 14 resulting in a second phase shifted differential bit stream 20. Preferably the first and second phase shifters separate the bit edge of bit streams 10, 12 as much as possible, that is, by one half bit time of either stream.

Both phase shifted differential bit stream 18, 20 are simultaneously fed to a logic circuit 22 that combines the bit stream 18 and the bit stream 20 producing a differentially encoded interleaved bit stream 24 that has a data rate that is the sum of the data rates of the first bit stream 18 and the second stream 20. The differentially encoded interleaved bit stream 24 drives a modulator 26 that phase shift key modulates a laser carrier signal producing a differential phase shift keyed (DPSK) light signal for transmission through space or an optical fiber.

The phase shifters 14, 16 may feature electrical or mechanical interfaces for adjusting the phase of the input bit streams 10, 12. The phase shifters 14, 16 may also be lengths of transmission line to introduce a predetermined delay. The phase shifters 14, 16 may also be flip-flops driven by multiphase clocks.

The logic circuit 22 is preferably a high speed Exclusive-OR (XOR) gate. However, other logic circuits that produce an equivalent interleaved bit stream are also contemplated. For example, the logic circuit 22 may be an XNOR gate that produces an encoded interleaved bit stream 24 that is the logical inverse of the differentially encoded interleaved bit stream produced by an XOR gate.

The modulator 26 is a phase modulator that produces a differential phase shift key (DPSK) waveform. Amplitude and frequency modulators that produce amplitude shift key (ASK) waveforms or frequency shift key (FSK) waveforms are also contemplated. The modulator described produces one symbol per encoded bit. Modulators that modulate multiple bits per symbol are also contemplated. The carrier in this embodiment is a laser beam. Collimated light, microwaves or other electromagnetic waves are also contemplated as carriers.

Figure 2:
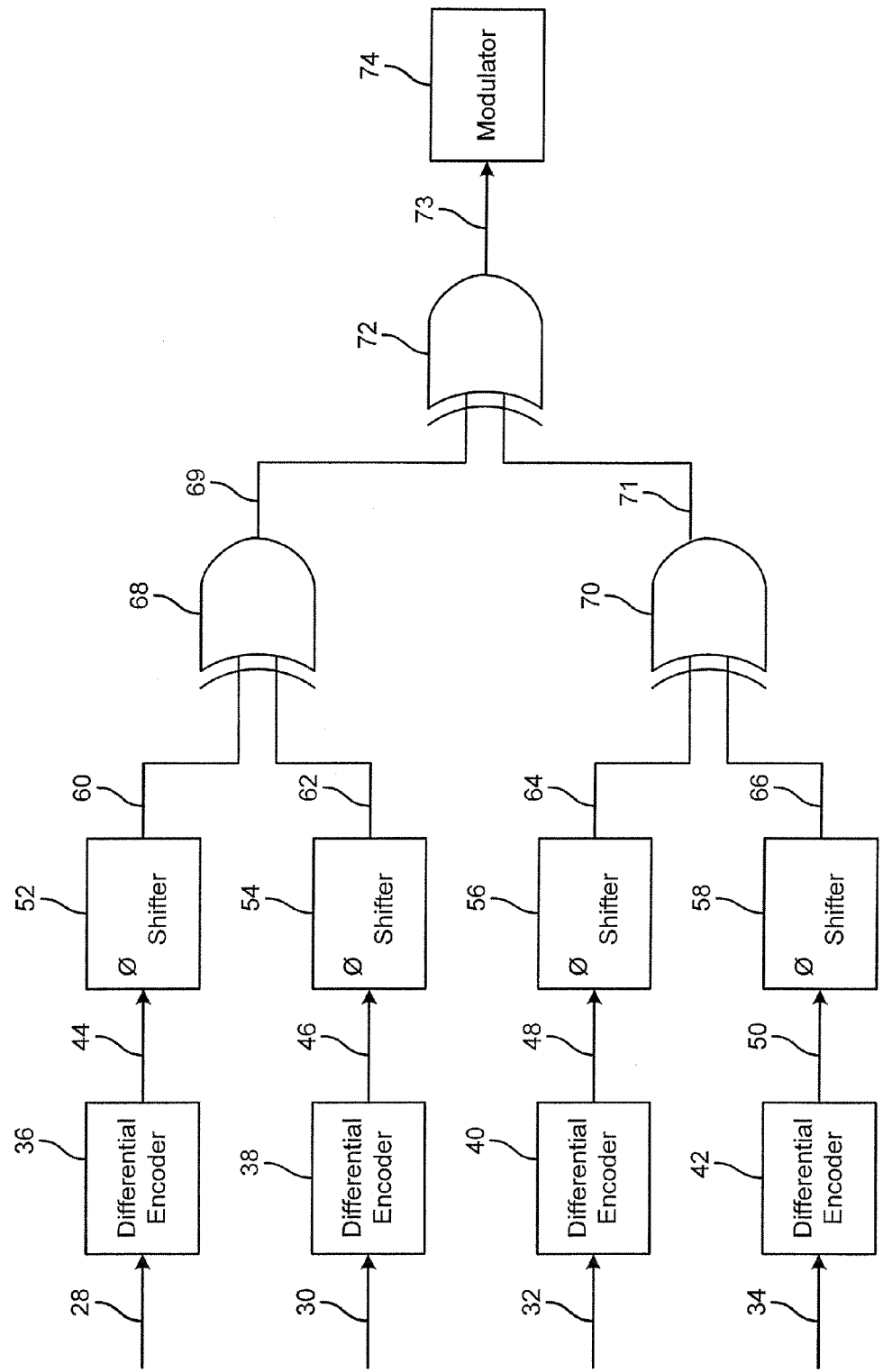
FIG. 2 is a block diagram of a high speed data encoder featuring a two stage interleaver.

FIG. 2 illustrates a high speed encoder that has four differential encoders and a two stage XOR tree. Four high speed data streams 28, 30, 32, 34 are fed to respective first, second, third and fourth differential encoders 36, 38, 40, 42 producing first, second, third and fourth differentially encoded bit streams 44, 46, 48, 50. The high speed data streams 28, 30, 32, 34 are each of the same data rate.

A first phase shifter 52, second phase shifter 54, third phase shifter 56, and fourth phase shifter 58 shift each of the respective differentially encoded bit streams 44, 46, 48, 50 by a unique phase angle, producing a first phase shifted data stream 60, a second phase shifted data stream 62, a third phase shifted data stream 64 and a fourth phase shifted data stream 66. In this embodiment, to get maximum separation, the first phase shifter 52 has a 0 degree phase shift, the second phase shifter has a 180 degree phase shift, the third phase shifter has a 90 degree phase shift and the fourth phase shifter has a 270 degree phase shift, where the phase values referred to are relative to the clock rate of the high speed stream at the final output of the tree.

The first and second phase shifted data streams 60, 62 are fed as inputs to a XOR gate 68. The third and fourth phase shifted data streams 64, 66 are fed as inputs to a second XOR gate 70.

The outputs 69, 71 of each XOR gate 68, 70 are interleaved bit streams having a data rate equal to the sum of the data rates of their inputs. Outputs 69, 71 are fed as the inputs to a third XOR gate 72. The output 73 of the third XOR gate 72 is a bit stream having a data rate equal to the sum of data rates of the differentially encoded phase shifted bit streams 60, 62, 64, 66. The output 73 feeds a modulator 74 that produces a differential phase shift keyed (DPSK) carrier signal.

It is preferred that the phase shifters 52, 54, 56, 58 shift the respective differentially encoded data streams 44, 46, 48, 50 evenly, separating the data streams by ninety degree phase angle increments. However, it is also contemplated that the phase shifters may shift the differentially encoded data streams 44, 46, 48, 50 by any phase angle as long as each data stream has a unique phase angle.

Figure 3:
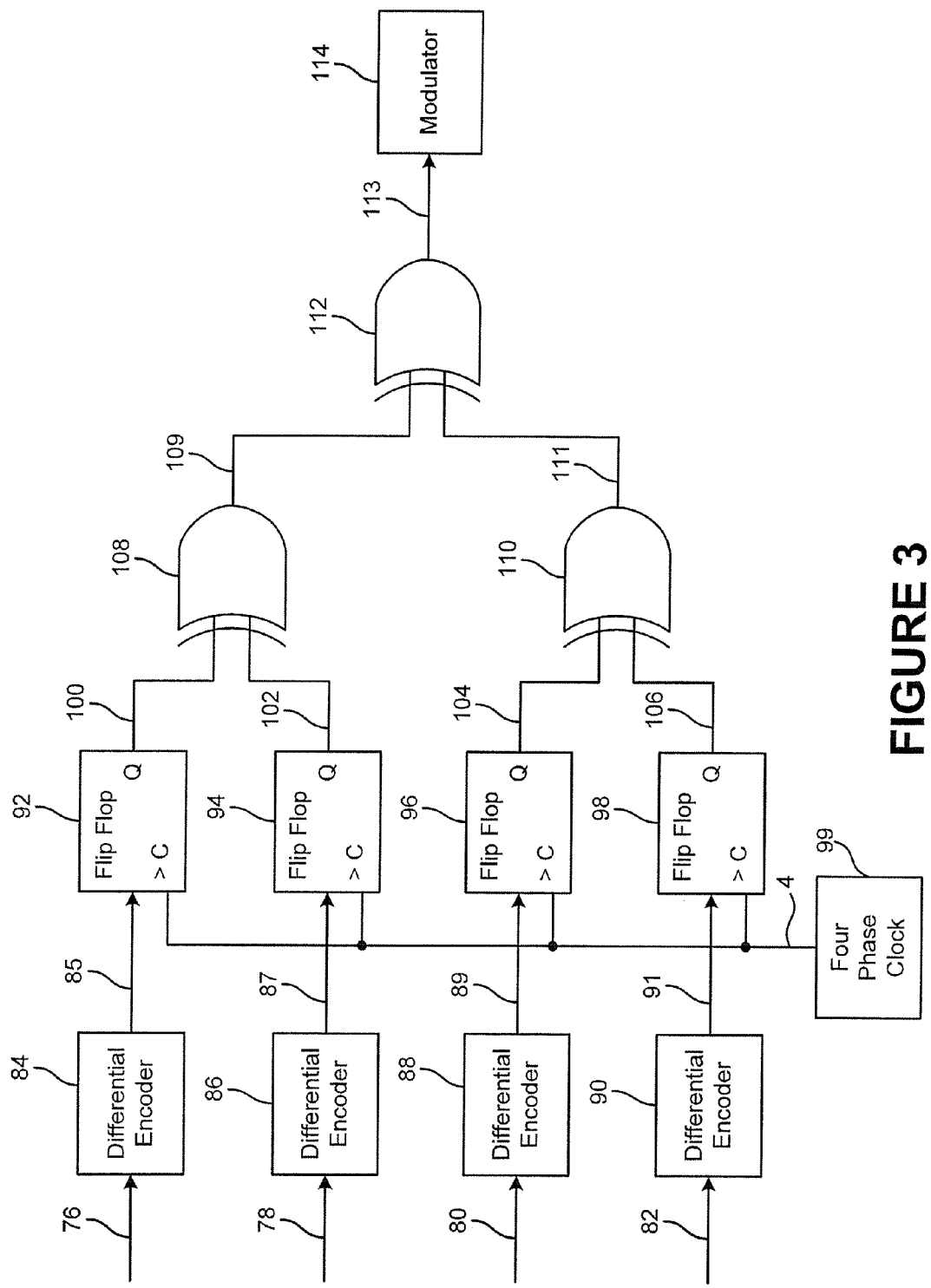
FIG. 3 is a block diagram of a high speed data encoder using a multi-phase clock and phase shifting flip-flops.

FIG. 3 illustrates the use of four retiming flip-flop phase shifters 92, 94, 96, 98 a phased clock 99, and an interleaving XOR tree. Four high speed data stream 76, 78, 80, 82 feed differential encoders 84, 86, 88, 90 producing data streams 85, 87, 89, 91 that are fed to respective flip-flops 92, 94, 96, 98.

A four phase clock 99 provides timing signals to each of the four flip-flops 92, 94, 96, 98. Each phase of the four phase clock 99 provides a unique timing signal for each flip-flop. Flip-flops 92, 94, 96, 98 are preferably D flip-flops with outputs that transition on the leading edge of the clock signal. However, any equivalent logic circuit is contemplated. The phases of the clocks driving the flip-flops 92, 94, 96, 98 produce a first flip-flop output 100, a second flip-flop output 102, a third flip-flop output 104, and a fourth flip-flop output 106 with each output being a differentially encoded bit stream with a unique phase.

The outputs 100, 102 for the first and second flip-flops 92, 94 are interleaved by a first XOR gate 108. The outputs 104, 106 from the third and fourth flip-flops 96, 98 are interleaved by a second XOR gate 110. The outputs 109, 111 of the XOR gates 108, 110 are interleaved in a final XOR gate 112. The output 113 of final XOR gate 112 drives a laser modulator 114.

Flip-flops 92, 94, 96, 98 are the preferred components for a phase shifter. The flip-flops are driven by a precise four phase clock 99. Consequently, the flip-flop outputs 100, 102, 104, 106 are precisely synchronized (retimed) with previously acquired phase jitter removed. Flip-flops 92, 94, 96, 98 also condition data streams 85, 87, 89, 91 minimizing the effects of previously acquired line losses and noise.

Figure 4:
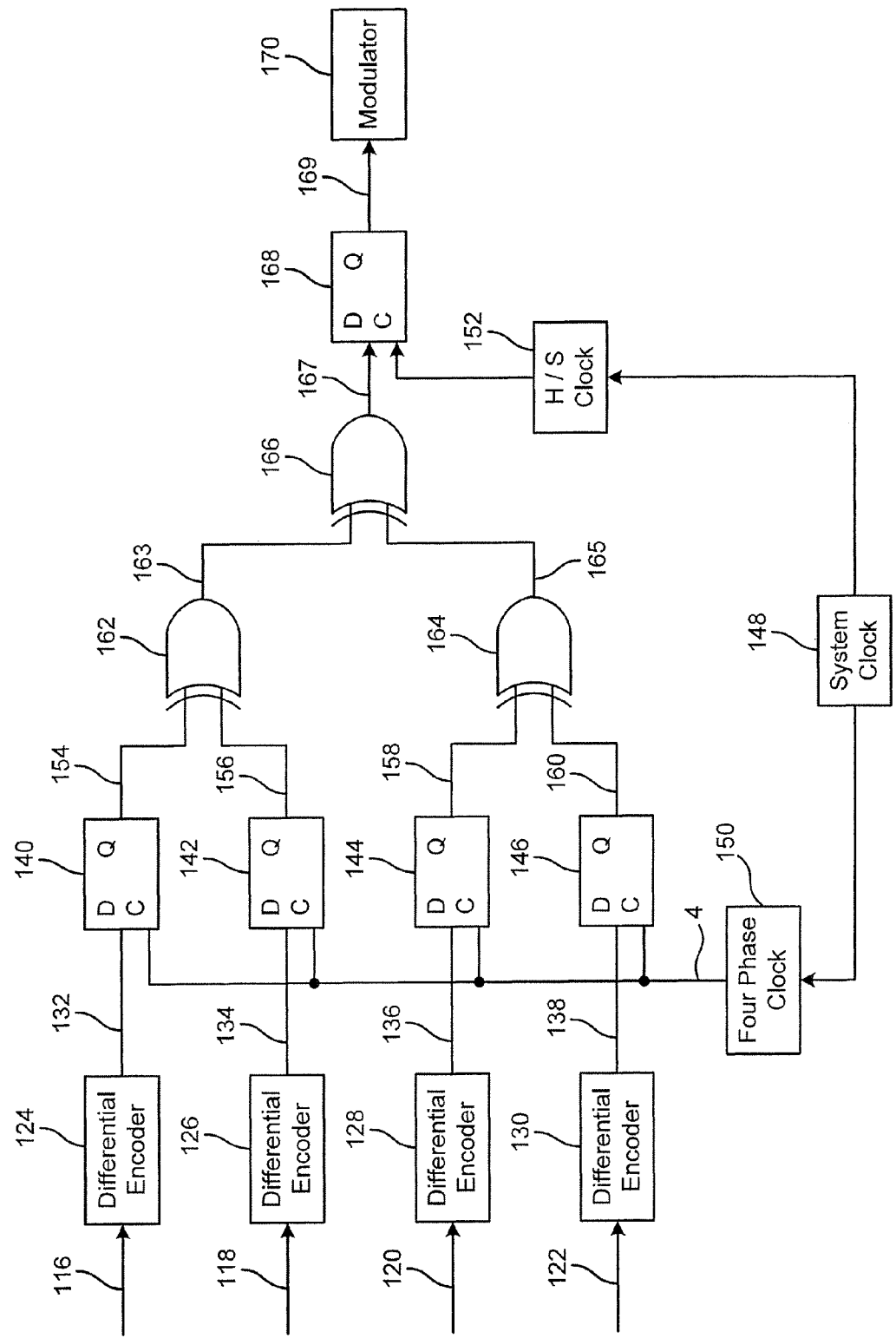
FIG. 4 is a block diagram of a high speed data encoder featuring a multi-phase clock and phase shifting flip-flops with a final retiming flip-flop.

FIG. 4 illustrates the use of four retiming flip-flop phase shifters, an interleaving XOR tree and a final retiming flip-flop. Four high speed data streams 116, 118, 120, 122 are fed to respective differential encoders 124, 126, 128, 130 producing respective first, second, third and fourth differential data streams 132, 134, 136, 138 that feed respective first, second, third, and fourth flip-flops 140, 142, 144, 146.

A system clock 148 provides timing signals to a four phase clock 150 and a high speed clock 152. The four phase clock 150 provides timing signals to each of the four flip-flops 140, 142, 144, 146. Each flip-flop receives unique timing signals which results in a unique phase shift at the outputs 154, 156, 158, 160 of the first, second, third and fourth flip-flops 140, 142, 144, 146. The first and second flip-flop outputs 154, 156 are interleaved in a first XOR gate 162. The third and fourth flip-flop outputs 158, 160 are interleaved in a second XOR gate 164.

The outputs 163, 165 of the first- and second XOR gates 162, 164 are interleaved by a third XOR gate 166. The output 167 of the third XOR gate 166 drives a retiming flip-flop 168. The retiming flip-flop is preferably a D flip-flop. The retiming flip-flop 168 receives timing signals from a high speed clock 152 and the output 167 of the third XOR gate 166. The retiming flip-flop 168 reduces noise and phase jitter in the output 167 of the third XOR gate 166. The output 169 of the retiming flip-flops 168 is supplied to a modulator 170 for modulation of a carrier signal.

Figure 5:
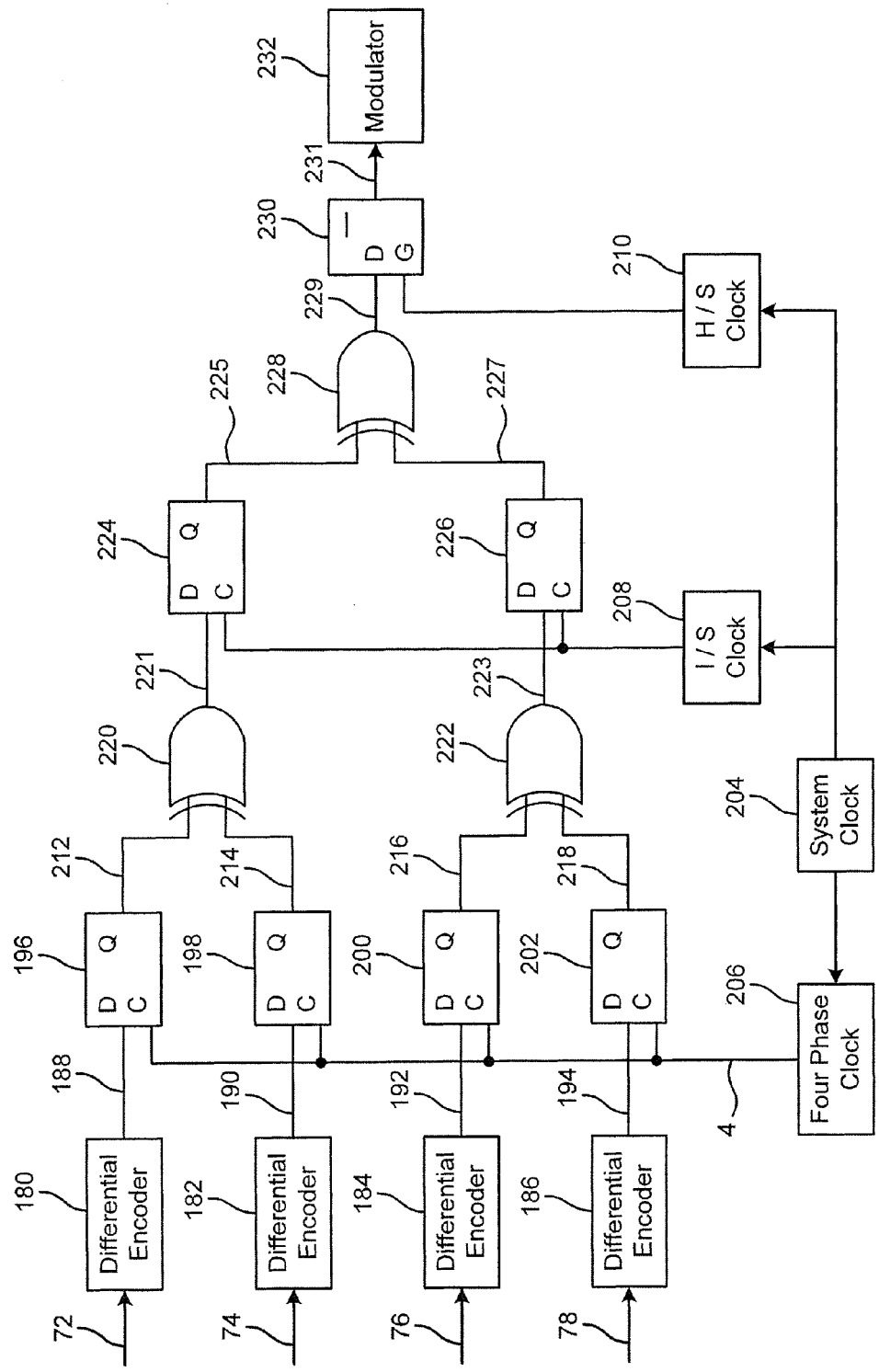
FIG. 5 is a block diagram of a high speed data encoder featuring multiple retiming flip-flops.

FIG. 5 illustrates the use of retiming flip-flop phase shifters, an XOR tree with intermediate retiming flip-flops and final retiming flip-flop. A first, second, third and fourth high speed data stream 172, 174, 176, 178 feed respective first, second, third, and fourth differential encoders 180, 182, 184,186 producing data streams 188, 190, 192, 194 whose signals respectively drive a first, second, third and fourth flip-flop 196, 198, 200, 202.

A system clock 204 provides timing signals to a four phase clock 206, an intermediate speed clock 208 and a high speed clock 210. The four phase clock 206 provides unique timing signals to each of the phase shifting flip-flops 196, 198, 200, 202. The flip-flops 196, 198, 200, 202 produce four phase shifted bit streams 212, 214, 216, 218. The first and second bit streams 212, 214 are interleaved by XOR gate 220. The third and fourth bit streams 216, 218 are interleaved by XOR gate 222. XOR gate 220 drives a first intermediate D flip-flop 224 which conditions and retimes the output 221 of the XOR gate 220 removing noise and phase jitter from the bit stream. XOR gate 222 drives a second intermediate D flip-flop 226 which conditions and retimes the output 223 of XOR gate 222. The two differentially encoded bit streams 225, 227 from respective D flip-flops 224, 226 are supplied to final XOR gate 228. Final XOR gate 228 combines the two data streams 225, 227 into a high speed data stream 229 which is fed to a D flip-flop 230.

D flip-flop 230 accepts timing signals from the high speed clock 210 and the high speed data stream 229 from the final XOR gate 228. The final D flip-flop 230 removes noise and phase jitter and retimes the data stream. The output 231 from the final D flip-flop 230 drives a laser modulator 232 producing a DPSK signal.

Figure 6:
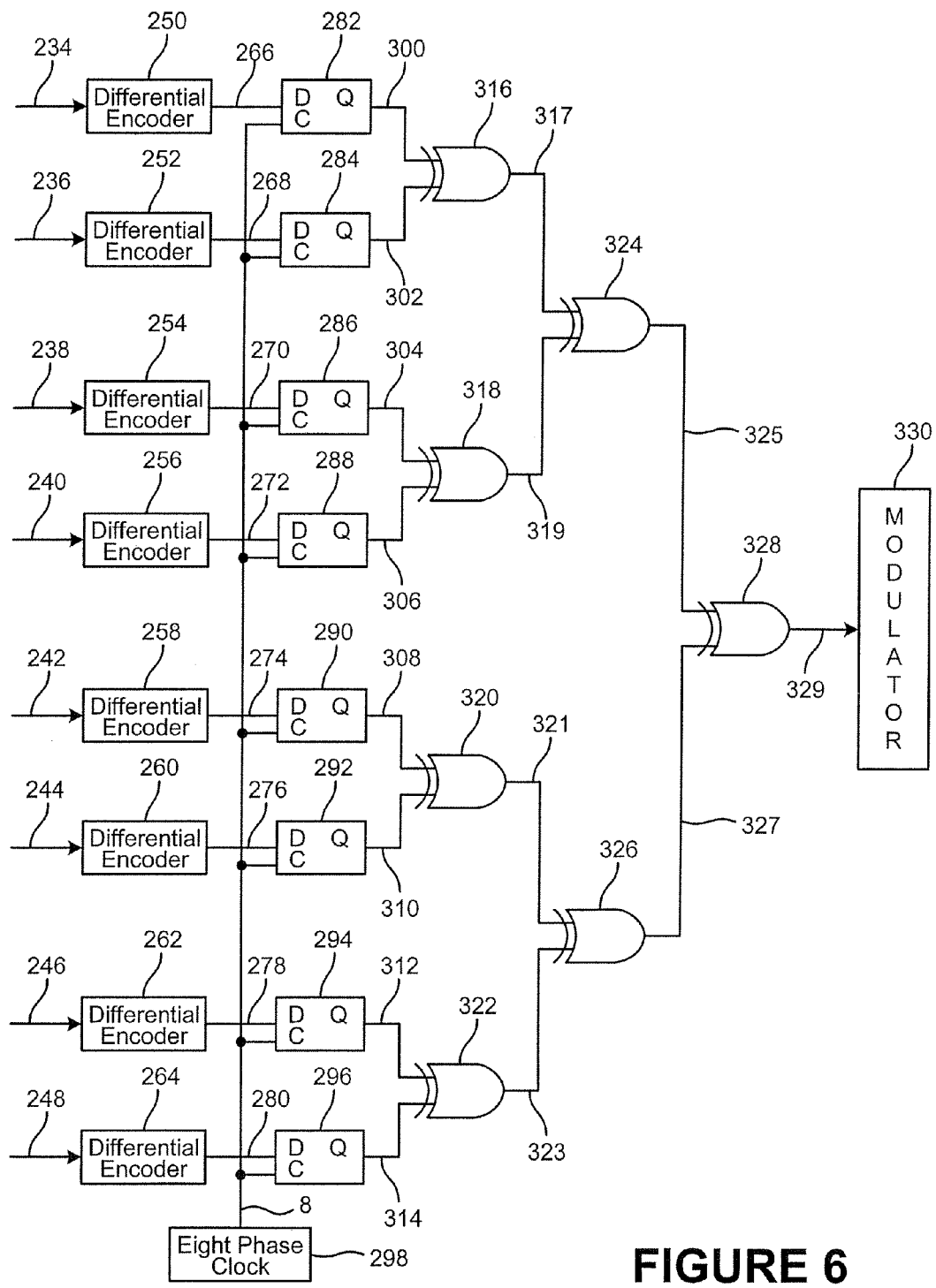
FIG. 6 is a block diagram of a high speed data encoder featuring an 8:1 XOR tree structure.

FIG. 6 illustrates the use of eight differential encoders with corresponding flip-flop phase shifters and a three stage interleaver. A first, second, third, fourth, fifth, sixth, seventh and eighth high speed data stream 234, 236, 238, 240, 242, 244, 246, 248 feed first, second, third, fourth, fifth, sixth, seventh, and eighth differential encoders 250, 252, 254, 256, 258, 260, 262, 264 producing corresponding first, second, third, fourth, fifth, sixth, seventh, and eighth differential data streams 266, 268, 270, 272, 274, 276, 278, 280 that feed respective first, second, third, fourth, fifth, sixth, seventh and eighth flip-flops 282, 284, 286, 288, 290, 292, 294 and 296.

An eight phase clock 298 provides clocking signals to each of the eight flip-flops 282, 284, 286, 288, 290, 292, 294, 296 with each successive clock signal shifted 45 degrees. The outputs 300, 302, 304, 306, 308, 310, 312, 314 of the first, second, third, fourth, fifth, sixth, seventh and eighth flip-flops 282, 284,286, 288, 290, 292, 294, 296 are phase shifted differential bit streams.

The first and second flip-flop outputs 300, 302 are interleaved in a first-stage XOR gate 316. The third and fourth flip-flop outputs 304, 306 are interleaved in a first-stage XOR gate 318. The fifth and sixth flip-flop outputs 308, 310 are interleaved in a first-stage XOR gate 320. The seventh and eighth flip-flop outputs 312, 314 are interleaved in a first-stage XOR gate 322.

The outputs 317, 319, 321, 323 of the first-stage XOR gates are interleaved in a second-stage of XOR gates 324, 326. The outputs 317, 319 of the first and second first-stage XOR gates 316, 318 are fed to second-stage XOR gate 324. The outputs 321, 323 of the first-stage XOR gates 320, 322 are fed to a second-stage XOR gate 326.

The outputs 325, 327 of the second-stage XOR gates 324, 326 are fed to a third stage XOR gate 328. The output 329 of XOR gate 328 is a high speed differentially encoded bit stream 329 that is fed to a laser modulator 330.

Figure 7:
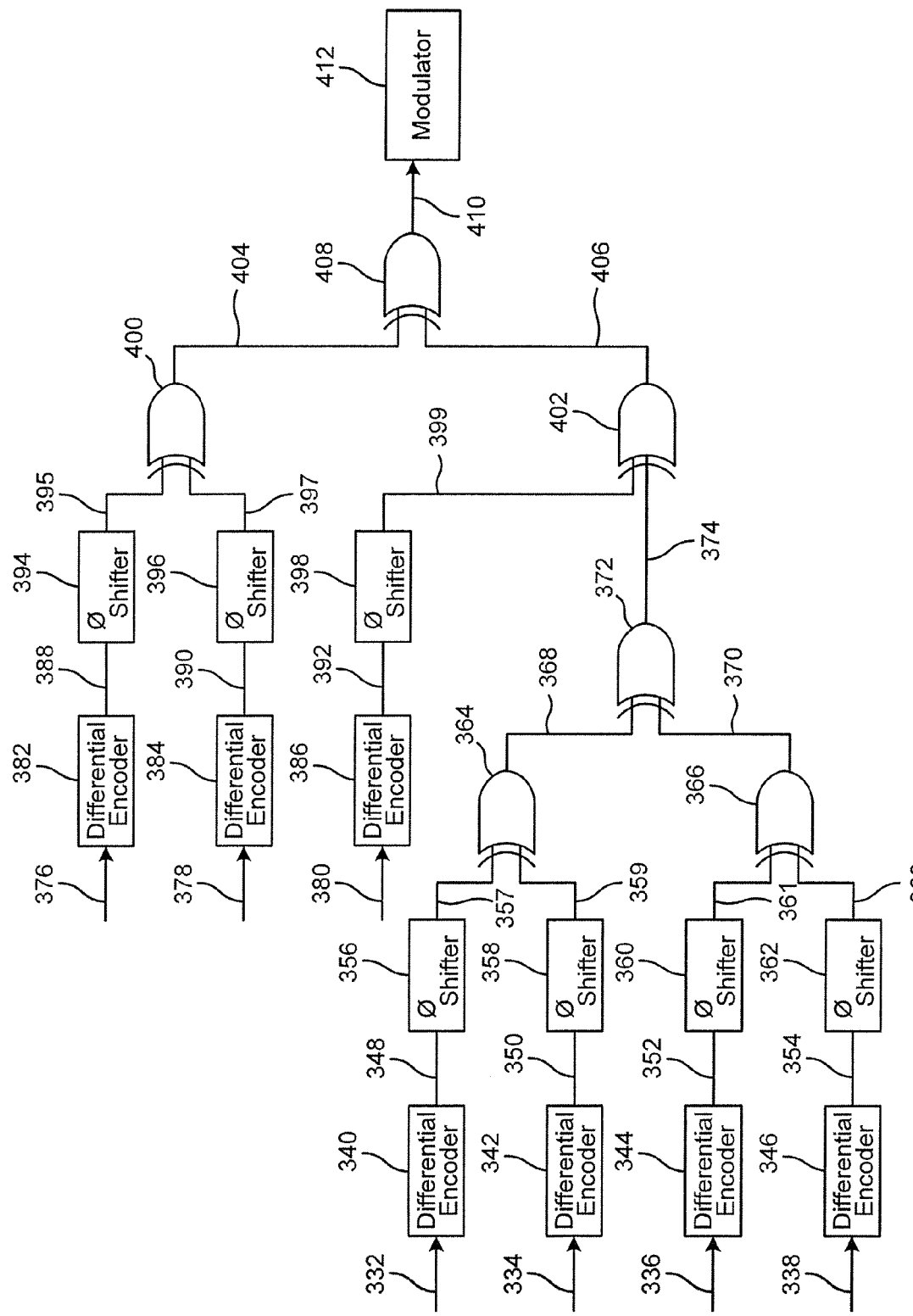
FIG. 7 is a block diagram of a high speed data encoder featuring multiple XOR tree structures.

FIG. 7 illustrates the interleaving of multiple data streams at different speeds into one high speed differentially encoded bit stream. A first, second, third, and fourth data stream 332, 334, 336, 338 having data rates of 2.5 Gigahertz (GHz) for example are fed to a first, second, third and fourth respective differential encoder 340, 342, 344, 346 producing corresponding data bit streams 348, 350, 352, 354. Each of the encoded bit streams 348, 350, 352, 354 is at a 2.5 GHz data rate, with a corresponding bit time of 400 picoseconds. A first phase shifter 356 shifts the first differentially encoded bit stream 348 by 0 picoseconds. A second phase shifter 358 shifts the second differentially encoded bit stream 350 by 200 picoseconds. A third phase shifter 360 shifts the third differentially encoded bit stream 352 by 100 picoseconds. A fourth phase shifter 362 shifts the fourth differentially encoded bit stream 354 by 300 picoseconds.

The outputs 357, 359 of the first and second phase shifter 356, 358 are interleaved by a first-stage XOR gate 364 producing a first differentially encoded bit stream 368 with data rate of 5 GHz. Similarly, the outputs 361, 363 of the third and fourth phase shifter 360, 362 are interleaved by first-stage XOR gate 366 producing a second differentially encoded interleaved bit stream 370. The first differentially encoded bit stream 368 and the second differentially encoded bit stream 370 provide input to second-stage XOR gate 372. The output 374 of the second stage XOR gate 372 is a differentially encoded bit stream with a data rate of 10.0 GHz, with a corresponding bit time of 100 picoseconds.

A fifth, sixth and seventh data stream 376, 378, 380 having data rates of 10.0 GHz, for example, are differentially encoded by corresponding fifth, sixth, and seventh differential encoders 382, 384, 386 producing a fifth differential bit stream 388, a sixth differential bit stream 390 and a seventh differential bit stream 392. Each of the encoded bit streams 388, 390, 392 has a 10 GHz data rate. A fifth phase shifter 394 shifts the fifth differentially encoded bit stream 388 by 25 picoseconds. A sixth phase shifter 396 shifts the sixth differentially encoded bit stream 390 by 75 picoseconds. A seventh phase shifter 398 shifts the seventh differentially encoded bit stream 392 by 50 picoseconds.

A third stage XOR gate 400 interleaves the output 395, 397 of the fifth and sixth phase shifters 394, 396 to produce an interleaved bit stream 404 with a 20 GHz data rate. A third-stage XOR gate 402 interleaves the output 399 of the seventh phase shifter 398 with the output 374 of the second-stage XOR gate 372 producing an interleaved bit stream 406 with a 20 GHz data rate. The outputs 404, 406 of the XOR gates 400, 402 are interleaved in a final XOR gate 408 producing an interleaved differentially encoded bit stream 410 with a 40 GHz rate with a corresponding bit time of 25 picoseconds. The bit stream 410 drives a laser modulator 412 that phase shift keys a carrier signal producing a 40 GHz DPSK signal. The invention illustrated in FIG. 7 is one possible topology of differential encoders and logic gate interleavers. It is important to recognize that each of the phase shifters throughout any topology should shift the differential data streams into unique phase angles. Preferably, the data stream bandwidth is distributed evenly over the 360 degrees of phase bandwidth to reduce coding/decoding and transmission bit errors.

In this embodiment each stage has a data rate that is twice the data rate of the previous stage. It is contemplated that differentially encoded bit streams of different data rates may be interleaved in an XOR gate when the first input data rate is an integral multiple of the second.

While descriptions of FIGS. 1-7 have implicitly assumed either zero gate delay or uniform gate delay as well as zero or uniform propagation delays, control of timing skews is essential for control of phase separation in the final data pattern. Those skilled in the art will recognize the usefulness of phase shifters and/or correctly timed flip-flops to achieve desired phase angles in the final interleaved data sequences.

What is claimed is:

1. A data encoder for high speed modulation of a carrier signal, the data encoder comprising:
   an Exclusive-OR (XOR) gate having a first and second input and an output;
   a first phase shifter, having a predetermined phase shift, connected to the first input of the XOR gate;
   a second phase shifter having a predetermined phase shift, different from the first phase shifter, connected to the second input of the XOR gate;
   a first differential encoder for supplying a first differentially encoded two state data stream having a first bit rate, to the first phase shifter; and
   a second differential encoder for supplying a second differentially encoded two state data stream having a second bit rate, equal to the first bit rate, to the second phase shifter;
   the XOR gate combining the first and second differentially phase shifted, two state encoded data streams having the same bit rates into a single two state data stream having a bit rate that is the sum of the first and second bit rates, for modulating the carrier signal.

2. The data encoder of claim 1 further comprising a retiming circuit connected to the output of the interleaving logic circuit.

3. The data encoder of claim 2 wherein the retiming circuit is a D flip-flop.

4. The data encoder of claim 1 further comprising a phase shift key modulator connected to the output of the interleaving logic circuit.

5. The data encoder of claim 1 wherein the first and second phase shifters are predetermined lengths of transmission line introducing different time delays.

6. A data encoder for high speed modulation of a carrier signal, the data encoder comprising:
   an Exclusive-OR (XOR) gate having a first and second input and an output;
   a first flip-flop having a data input, an output and a clock signal input, the output being connected to the first input of the XOR gate;
   a second flip-flop having a data input, an output and a clock signal input, the output being connected to the second input of the XOR gate;
   a multiphase clock providing predetermined different clock signals to the clock inputs of the first flip-flop and the second flip-flop;
   a first differential encoder supplying a first differentially encoded two state data stream having a first bit rate, to the input of the first flip-flop; and
   a second differential encoder for supplying a second differentially encoded two state data stream having a second bit rate, equal to the first bit rate, to the input of the second flip-flop;
   the XOR gate combining the outputs of the first and second flip-flops into a single two state data stream having a bit rate that is the sum of the first and second bit rates, for modulating the carrier signal.

7. The data encoder of claim 6 wherein the first and second flip-flops are D flip-flops.

8. The data encoder of claim 6 further comprising a modulator connected to the output of the logic circuit for modulating the output of the logic circuit on a carrier signal.

9. A data encoder for high speed modulation of a carrier signal, the encoder comprising:
   a first logic circuit having a first and second input and an output;
   a second logic circuit having a first and second input and an output, the output connected through a first transmission line to the first input of the first logic circuit;
   a third logic circuit having a first and second input and an output, the output connected through a second transmission line to the second input of the first logic circuit;
   a first phase shifter, having a predetermined phase shift, connected to the first input of the third logic circuit;
   a second phase shifter having a predetermined phase shift, different from the first phase shifter, connected to the second input of the third logic circuit;
   a third phase shifter having a predetermined phase shift, different from the first and second phase shifter, connected to the first input of the second logic circuit;
   a fourth phase shifter having a predetermined phase shift, different from the first, second and third phase shifter, connected to the second input of the second logic circuit;
   a first differential encoder for supplying a first differentially encoded data stream having a first bit rate, to the first phase shifter;
   a second differential encoder for supplying a second differentially encoded data stream having a second bit rate, equal to the first bit rate, to the second phase shifter;
   a third differential encoder for supplying a third differentially encoded data stream having a third bit rate, equal to the first bit rate, to the third phase shifter; and
   a fourth differential encoder for supplying a fourth differentially encoded data stream having a fourth bit rate, equal to the first bit rate, to the fourth phase shifter;
   whereby the first, second and third logic circuits interleave the differentially encoded data streams into a single data stream having a bit rate that is the sum of the first second third and fourth bit rates, for modulating the carrier signal.

10. The data encoder of claim 9 wherein the first and second transmission lines further comprise retiming circuits.

11. The data encoder of claim 10 wherein the retiming circuits of the first and second transmission lines are D flip-flops.

12. The data encoder of claim 10 wherein the phase shifters are flip-flops driven by a multiphase clock.

13. A data encoder for high speed modulation of a carrier signal, the encoder comprising:
   $N_1$ interleaving logic circuits, $N_1$ being a positive integer, each $N_1$ interleaving logic circuit having a first and second input, and an output;
   $N_2$ phase shifters, $N_2$ being twice the number of $N_1$ logic circuits, each $N_2$ phase shifter having a predetermined phase shift, and being uniquely connected to the first or second input of a respective $N_1$ interleaving logic circuit;
   $N_2$ differential encoders, each differential encoder supplying a differentially encoded data stream having a unique bit rate to a respective N2 first phase shifter;
   N3 interleaving logic circuits, N3 being half the number of N1 interleaving logic circuits, each N3 interleaving logic circuit having a first and second input and an output, the outputs of the N1 interleaving logic circuits connected to respective first or second inputs of respective N3 interleaving logic circuits;

N4 interleaving logic circuits, $N_4$ being half the number of $N_3$ interleaving logic circuits, each $N_4$ interleaving logic circuit having a first and a second input and an output, the outputs of the $N_3$ interleaving logic circuits connected to respective first or second inputs of respective $N_4$ interleaving logic circuits;

whereby each logic circuit combines the data streams at the respective first and second inputs into a single data stream at the respective output, the output having a bit rate that is the sum of the bit rates of the data streams at the first and second inputs.

14. The data encoder of claim 13 wherein the number of differential encoders is 8.

15. The data encoder of claim 13 wherein the number of differential encoders is 16.

16. The data encoder of claim 13 wherein the phase shifters are predetermined lengths of transmission line.

17. The data encoder of claim 13 wherein the phase shifters are flip-flops driven by a multi-phase clock.

18. The data encoder of claim 13 wherein the logic circuits are XOR gates.

19. A data encoder for high speed modulation of a carrier signal, the encoder comprising:
   a first logic circuit having a first and second input and an output;
   a second logic circuit having a first and second input and an output, the output connected through a first transmission line with the first input of the first logic circuit;
   a third logic circuit having a first and second input and an output, the output connected through a second transmission line with the second input of the first logic circuit;
   a first phase shifter, having a predetermined phase shift, connected to the first input of the second logic circuit;
   a second phase shifter, having a predetermined phase shift different from the first phase shifter connected to the second input of the second logic circuit;
   a third phase shifter, having a predetermined phase shift different from the first and second phase shifters connected to the first input of the third logic circuit;
   a fourth logic circuit having a first and second input and an output, the logic circuit connected through a third transmission line with the second input of the third logic circuit;
   a fifth logic circuit having a first and second input and an output, the logic circuit connected through a fourth transmission line with first input of the fourth logic circuit;
   a sixth logic circuit having a first and second input and an output, the logic circuit connected through a fifth transmission line with second input of the fourth logic circuit;
   a fourth phase shifter, having a predetermined phase shift different from the first, second and third phase shifters, connected to the first input of the fifth logic circuit;
   a fifth phase shifter, having a predetermined phase shift different from the first, second, third and fourth phase shifters, connected to the second input of the fifth logic circuit;
   a sixth phase shifter, having a predetermined phase shift different from the first, second, third, fourth and fifth phase shifters, connected to the first input of the sixth logic circuit;
   a seventh phase shifter, having a predetermined phase shift different from the first, second, third, fourth, fifth, and sixth phase shifters, connected to the second input of the sixth logic circuit;
   a first differential encoder for supplying a first differentially encoded data stream having a first bit rate, to the first phase shifter;
   a second differential encoder for supplying a second differentially encoded data stream having a second bit rate, equal to the first bit rate, to the second phase shifter;
   a third differential encoder for supplying a third differentially encoded data stream having a third bit rate, equal to the first bit rate, to the third phase shifter;
   a fourth differential encoder for supplying a fourth differentially encoded data stream having a fourth bit rate, equal to one quarter the first bit rate, to the fourth phase shifter;
   a fifth differential encoder for supplying a fifth differentially encoded data stream having a fifth bit rate, equal to one quarter the first bit rate, to the fifth phase shifter;
   a sixth differential encoder for supplying a sixth differentially encoded data stream having a sixth bit rate, equal to one quarter the first bit rate, to the sixth phase shifter;
   a seventh differential encoder for supplying a seventh differentially encoded data stream having a seventh bit rate, equal to one quarter the first bit rate, to the seventh phase shifter;
   whereby the fourth, fifth, sixth, and seventh logic circuits interleave the fourth, fifth, sixth, and seventh differential data streams into a single intermediate data stream with the first second and third data logic circuits interleaving the intermediate data stream with the first, second, and third differential data streams creating a single interleaved data stream for modulating the carrier signal.

20. The data encoder of claim 19 wherein the phase shifters are predetermined lengths of transmission line.

21. The data encoder of claim 19 wherein the phase shifters are flip-flops driven by a one or more clocks.

22. The data encoder of claim 19 wherein the logic circuits are XOR gates.

23. A method for high speed modulation of a carrier signal with encoded data comprising the steps of:
   differentially encoding a first two state data stream having a first bit rate;
   differentially encoding a second two state data stream having a second bit rate equal to the first bit rate;
   phase shifting the first differentially encoded two state data stream by a predetermined phase;
   phase shifting the second differentially encoded two state data stream by a predetermined second phase different from the first phase;
   interleaving the first and second differentially encoded, phase shifted two state data streams into a single two state data stream having a third bit rate that is the sum of the first and second bit rates;
   differentially encoding a third data stream having a fourth bit rate equal to the third bit rate;
   phase shifting the differentially encoded third data stream by a predetermined phase different from the first and second phases;
   interleaving the third differentially encoded, phase shifted data stream with the single data stream; and
   modulating the carrier signal with the interleaving third and single data stream.

* * * * *